(12) United States Patent
Pozivilko et al.

(10) Patent No.: US 8,991,566 B2
(45) Date of Patent: Mar. 31, 2015

(54) CALIPER BRAKE

(75) Inventors: Peter J. Pozivilko, Saint Joseph, MI (US); Jeromy A. Hoar, Berrien Springs, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 155 days.

(21) Appl. No.: 13/169,530

(22) Filed: Jun. 27, 2011

(65) Prior Publication Data

US 2012/0325599 A1    Dec. 27, 2012

(51) Int. Cl.
| | | |
|---|---|---|
| F16D 65/14 | (2006.01) | |
| F16D 55/2265 | (2006.01) | |
| F16D 65/095 | (2006.01) | |
| F16D 55/00 | (2006.01) | |
| F16D 121/04 | (2012.01) | |

(52) U.S. Cl.
CPC .......... *F16D 55/2265* (2013.01); *F16D 65/095* (2013.01); *F16D 2055/007* (2013.01); *F16D 2121/04* (2013.01)
USPC ..................................... 188/73.31; 188/73.45

(58) Field of Classification Search
USPC ................ 188/71.1, 72.4, 73.1, 73.31, 73.32, 188/73.45, 18 A
See application file for complete search history.

(56) References Cited

U.S. PATENT DOCUMENTS

| | | | | |
|---|---|---|---|---|
| 4,031,986 A | * | 6/1977 | Thompson | 188/72.4 |
| 4,106,595 A | * | 8/1978 | Kimura et al. | 188/73.45 |
| 4,530,423 A | * | 7/1985 | Ritsema | 188/73.39 |
| 4,609,079 A | * | 9/1986 | Mery | 188/73.45 |
| 4,784,243 A | * | 11/1988 | Mery | 188/73.45 |
| 5,217,093 A | * | 6/1993 | Carpenter | 188/73.45 |
| 5,439,078 A | * | 8/1995 | Baumgartner et al. | 188/73.45 |
| 5,730,258 A | * | 3/1998 | Evans | 188/73.44 |

* cited by examiner

*Primary Examiner* — Robert A Siconolfi
*Assistant Examiner* — Vu Q Nguyen
(74) *Attorney, Agent, or Firm* — Renner, Kenner, Greive, Bobak, Taylor & Weber

(57) ABSTRACT

A caliper brake including a generally U-shaped housing including a first portion, a second portion, a bridge, and an opening. Spaced mounting bolts extend between the first and second portions of the housing and across the opening. Mounting sleeves are carried by the mounting bolts and received within bushings in the first and second portions of the housing. A pair of stators is carried by the mounting sleeves and capable of movement to engage a rotor positioned therebetween. The housing also includes bridge extensions at each end of the bridge extending laterally outward beyond and downward below the mounting bolts.

11 Claims, 5 Drawing Sheets

CALIPER BRAKE

TECHNICAL FIELD

This invention relates to a caliper brake. More particularly, this invention relates to a caliper brake that includes an improved bridge design that provides greater stiffness.

BACKGROUND ART

Caliper brakes are often provided on off the road vehicles, such as, construction vehicles, agricultural vehicles, utility vehicles, turf care machines and the like, to apply a braking force to a rotor. The caliper brake includes a pair of stators, one on each side of the rotor, that when compressed generate friction between the rotor and stators, which slows and stops the vehicle. Caliper brakes may be hydraulically actuated or mechanically actuated such as by a cam mechanism.

Caliper brakes typically include a housing that supports the brake components and provides a means for mounting the brake to the vehicle. The housing is generally U-shaped and includes two portions and a bridge that extends between the two portions, with the movable stators also being positioned between the two portions. When the caliper brake is actuated, a force is applied to one stator by an actuating mechanism, such as a piston in hydraulic caliper brakes. The force is reacted against the housing of the brake and travels through the bridge to the other portion of the housing, then to the other stator, and finally to the rotor. Because the bridge is radially offset from the actuating mechanism, the bridge is under tension and a bending load is created during actuation of the brake. As a result of these forces, the housing deflects, which results in performance issues. As the housing deflects, the travel of the piston increases, which increases the volume of fluid required to actuate the brake. A larger master cylinder or a longer pedal stroke may be required to provide the increased volume of fluid. In addition, deflection of the housing can cause the brake to drag on the rotor because the stators do not retract completely. The housing deflection causes the caliper to spread apart under load, which may act against the retraction forces created by biasing seals provided around hydraulic pistons. Thus, if deflection is excessive, it can cause the brake to drag.

A number of various solutions to the problem of housing deflection in caliper brakes have been attempted. One solution involves adding material to the bridge of the housing. However, the caliper brakes are often mounted within a wheel, and the amount of available space for enlarged calipers is limited. Another solution involves "wrapping" the bridge towards the centerline of the hydraulic piston to decrease the radial offset of the bridge. However, sufficient space must be provided for the mounting and removing of the stators during servicing of the brake. Extending the bridge may therefore require removal of the entire brake to service the stators, which is not desirable in that it adds time and expense. Yet another solution involves providing bolts and spacers between the two portions of the housing to improve stiffness. But, this solution adds parts, cost, and complexity to the brake, and requires precise manufacturing processes to ensure that the spacers and housing fit as necessary.

Thus, there is a need for an improved caliper brake that alleviates one or more of the above mentioned deficiencies of the prior art.

DISCLOSURE OF THE INVENTION

It is thus an object of one aspect of the present invention to provide a caliper brake with a housing having improved stiffness.

It is an object of another aspect of the present invention to provide a caliper brake, as above, having an improved bridge design.

It is an object of a further aspect of the present invention to provide a caliper brake, as above, having a bridge with lower sections extending below mounting spacers.

It is an object of an additional aspect of the present invention to provide a caliper brake, as above, where the stators are received over the mounting spacers, and are therefore removable from the brake without removing the brake from the vehicle.

These and other objects of the present invention, as well as the advantages thereof over existing prior art forms, which will become apparent from the description to follow, are accomplished by the improvements hereinafter described and claimed.

In general, a caliper brake housing according to the concepts of the present invention includes a first portion, a second portion spaced from the first portion to form an opening, and a bridge extending between the first and second portions and spanning the opening. A pair of laterally spaced mounting holes is provided in each of the first and second portions and is adapted to receive mounting bolts spanning the opening. Bridge extensions extend laterally outwardly from the housing beyond the holes and downwardly below the holes at each end of said housing.

In accordance with another aspect of the present invention, a caliper brake includes a generally U-shaped housing having a first portion, a second portion, and a bridge. A pair of mounting bolts extends between the first and second portions of the housing. Mounting sleeves are carried by each of the mounting bolts, and a pair of stators is carried by the mounting sleeves. Bridge extensions are provided at each end of the bridge extending laterally outwardly beyond the mounting bolts and downwardly below the mounting bolts.

In accordance with a further aspect of the present invention, a caliper brake includes a housing having a first portion, a second portion spaced from the first portion to form an opening, and a bridge extending between the first and second portions and spanning the opening. A pair of laterally spaced mounting holes is provided in each of the first and second portions. In addition, a bore with an open end at the opening is provided in the first portion of the housing. Bridge extensions extend laterally outwardly from the housing and downwardly below the holes at each end of the housing. A pair of mounting bolts extends between the first and second portions of the housing and are received in the mounting holes. A first mounting sleeve is carried by each of the mounting bolts and positioned within the first portion of the housing, and a second mounting sleeve is carried by each of the mounting bolts and positioned within the second portion of the housing. A pair of stators is carried by the mounting sleeves and capable of movement to engage a rotor; and a hydraulic piston is movably positioned within the bore and is adapted to engage one of the stators.

A preferred exemplary caliper brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
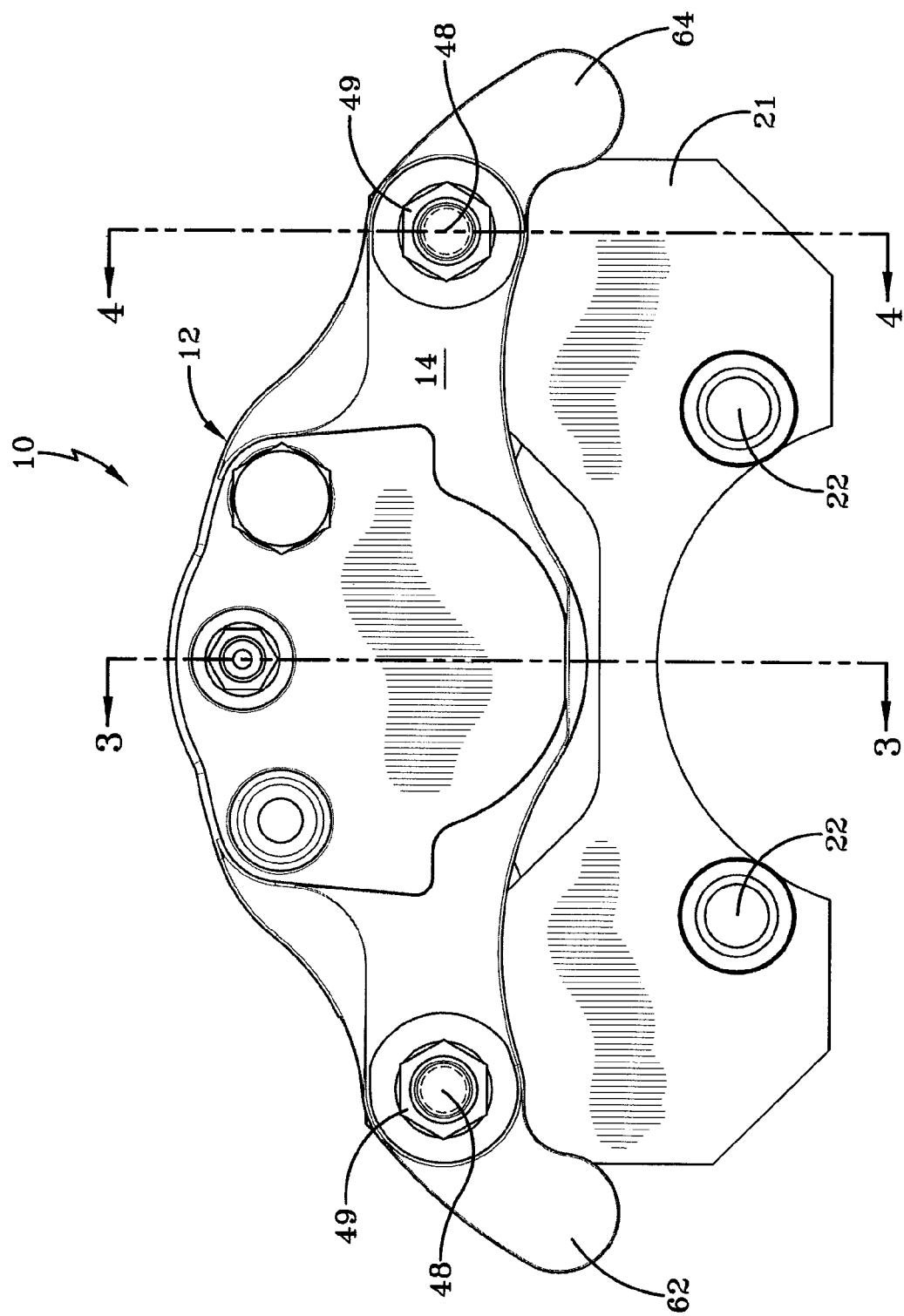
FIG. 1 is a front elevational view of a caliper brake according to the concepts of the present invention.
Figure 2:
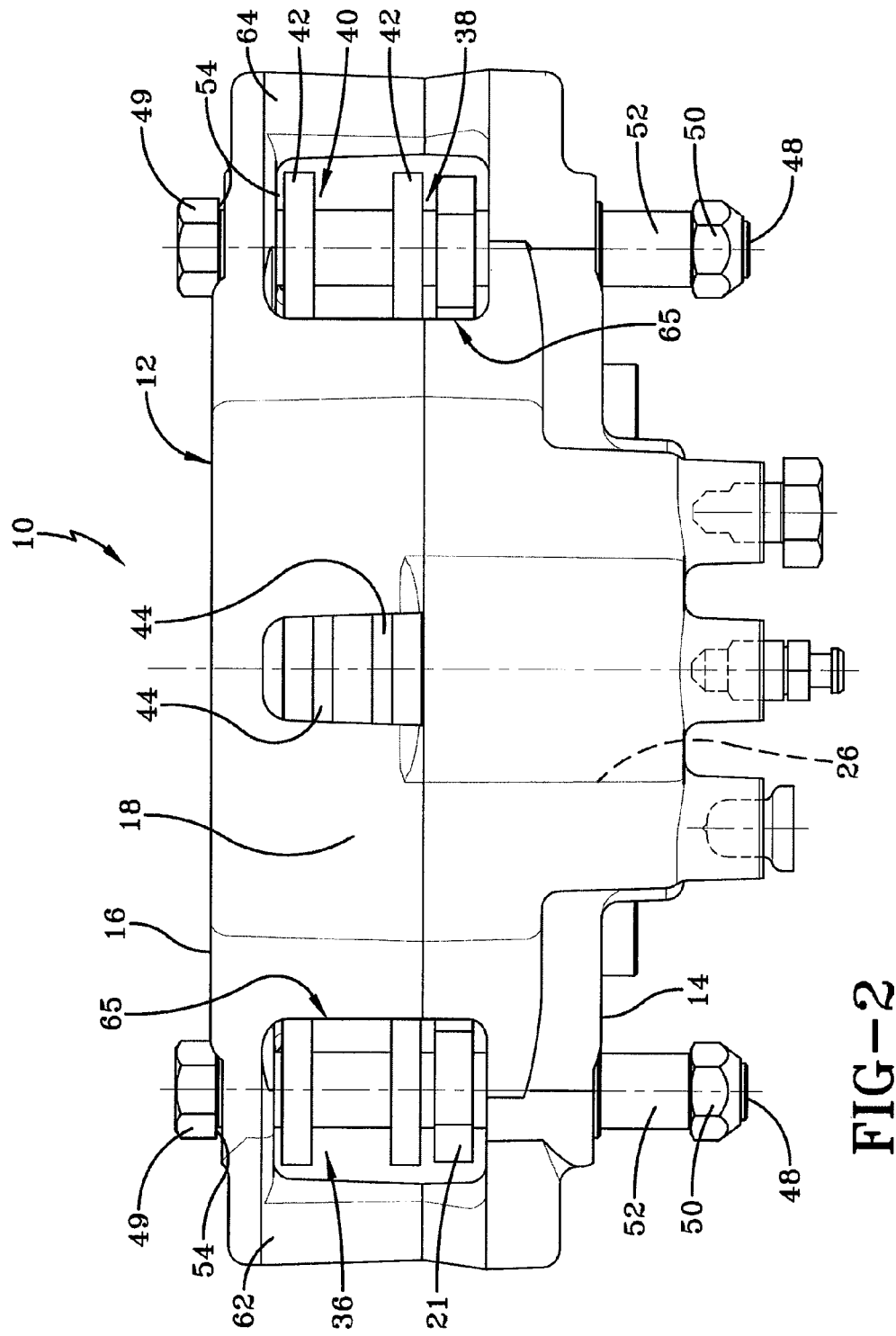
FIG. 2 is a top plan view of a caliper brake according to the concepts of the present invention.
Figure 3:
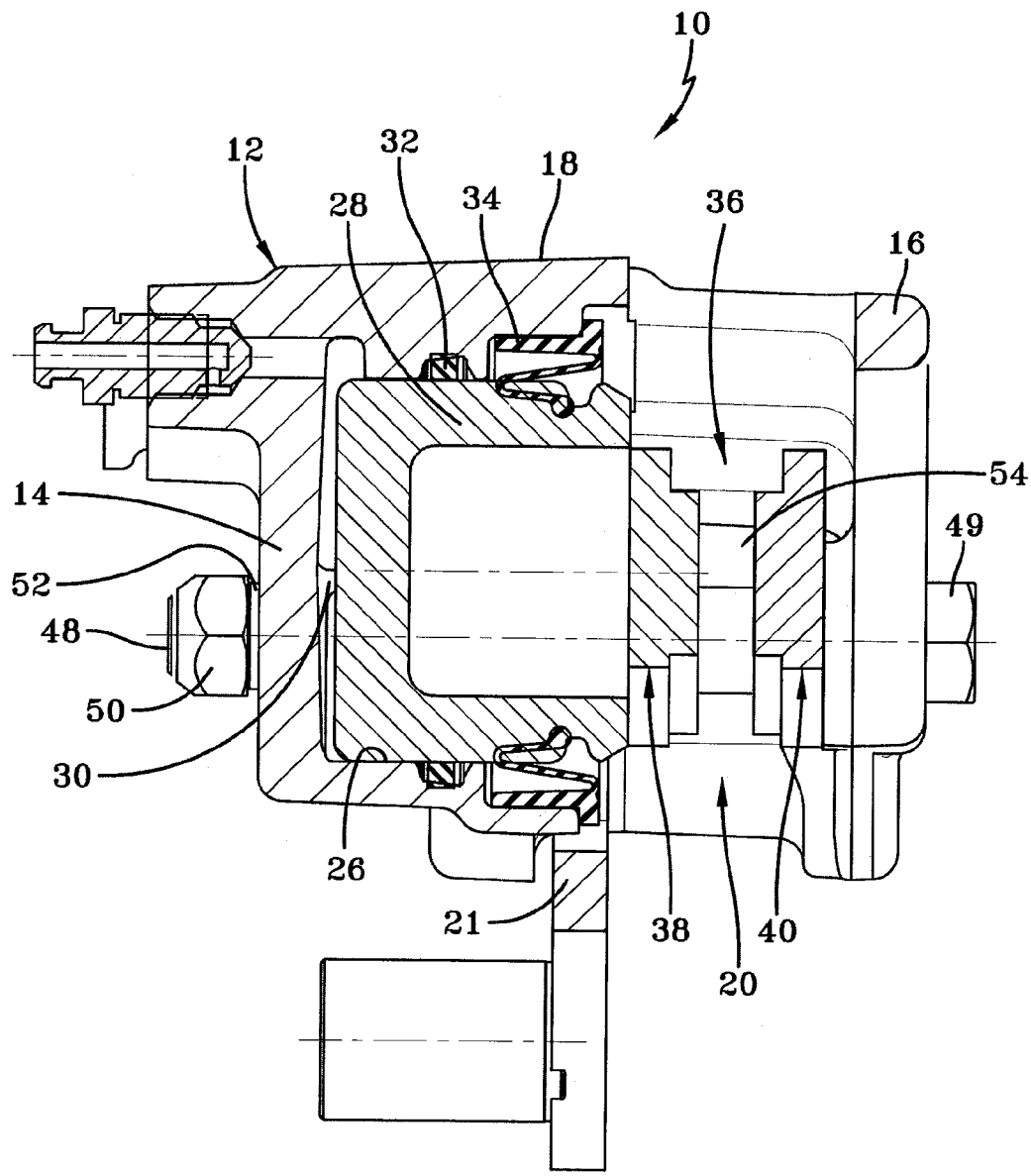
FIG. 3 is a sectional view of the caliper brake taken substantially along line 3-3 of FIG. 1.

A caliper brake made in accordance with the present invention is indicated generally by the numeral 10. Caliper brake 10 includes a housing 12 having a first portion 14 a second portion 16 connected at one edge by a bridge 18. Thus, housing 12 is generally U-shaped and includes an opening 20 between first portion 14 and second portion 16. A portion of a rotating rotor (not shown) is received within opening 20 and the stator plates of the brake act upon the rotor to prevent or slow movement of a vehicle, as will be discussed below.

Housing 12 acts to enclose and support the components of caliper brake 10, and also provides a mounting mechanism for securing the brake 10 to a vehicle. A mounting bracket 21 includes holes 22 adapted to receive brake mounting bolts (not shown) therethrough. The brake mounting bolts secure the brake 10 to a mounting surface. While brake 10 may be mounted to any surface so as to position it over a rotatable rotor, it is contemplated that caliper brake 10 may be secured to a mounting surface located adjacent to a wheel of the vehicle, or, alternatively, may be secured on an axle or transmission of the vehicle. In any case, braking forces acting on the rotor prevent rotation, and thereby prevent movement of the vehicle. The mounting bracket 21 is carried by bolts within the brake, as will be discussed in detail below.

The first portion 14 of housing 12 includes at least one hydraulic piston bore 26 therein that is in fluid communication with a high pressure fluid source that actuates the brake 10. A piston 28 is movably positioned in bore 26 and is adapted to slide axially when high pressure fluid is introduced into a fluid chamber 30 formed by the bore 26 and the piston 28. A square seal 32 is positioned around the outer periphery of the piston 28 to prevent high pressure fluid from leaking from the fluid chamber 30 and to bias the piston 28 in an unactuated position. A piston boot 34 may also be provided to further seal the fluid chamber 30. Such hydraulic actuation mechanisms are well known in the art, and therefore will not be described in great detail herein. It is contemplated that any hydraulic actuating mechanism known to those skilled in the art may be incorporated into the caliper brake 10 of the invention.

The hydraulic piston 28 is adapted to engage a stator assembly 36 when actuated. Stator assembly 36 includes a first stator 38 positioned adjacent to first portion 14 of housing 12 and a second stator 40 positioned adjacent to second portion 16 of housing 12. A gap is provided between the first and second stators 38, 40 to allow the rotor to extend therebetween. Each stator includes a stator plate 42 and a liner 44 carried on one surface of the stator plate. The liner is made of a high friction material and is positioned to engage the rotor when the brake 10 is actuated. More specifically, the liner 44 of first stator 38 faces toward second stator 40, and the liner 44 of second stator 40 faces toward first stator 38. As is well known in the art, actuation of hydraulic piston 28 causes first stator 38 to move toward second stator 40 and engage the rotor.

Figure 4:
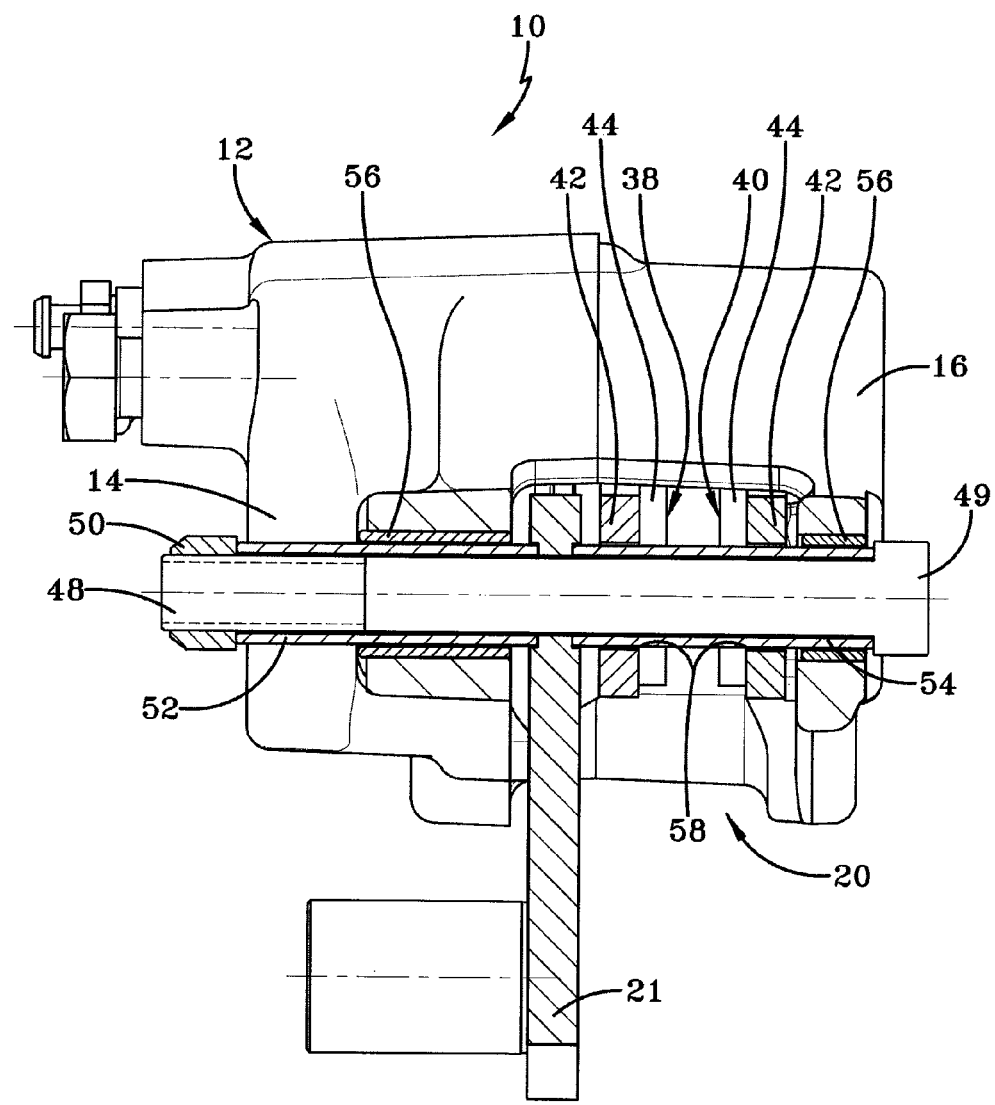
FIG. 4 is a sectional view of the caliper brake taken substantially along line 4-4 of FIG. 1.
Figure 5:
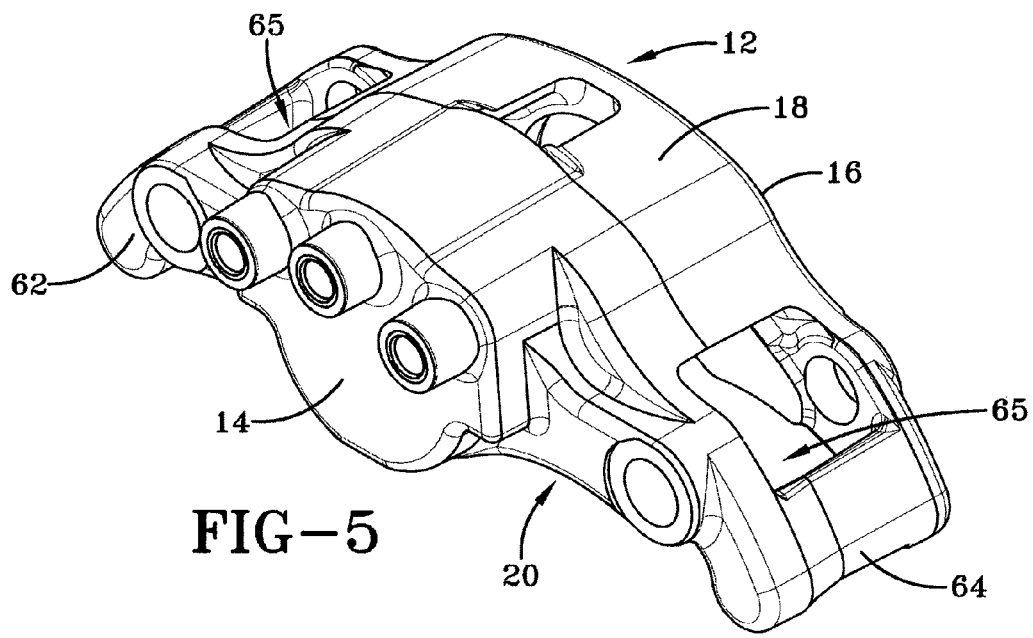
FIG. 5 is a front, top, left side perspective view of a caliper brake housing according to the concepts of the present invention.
Figure 6:
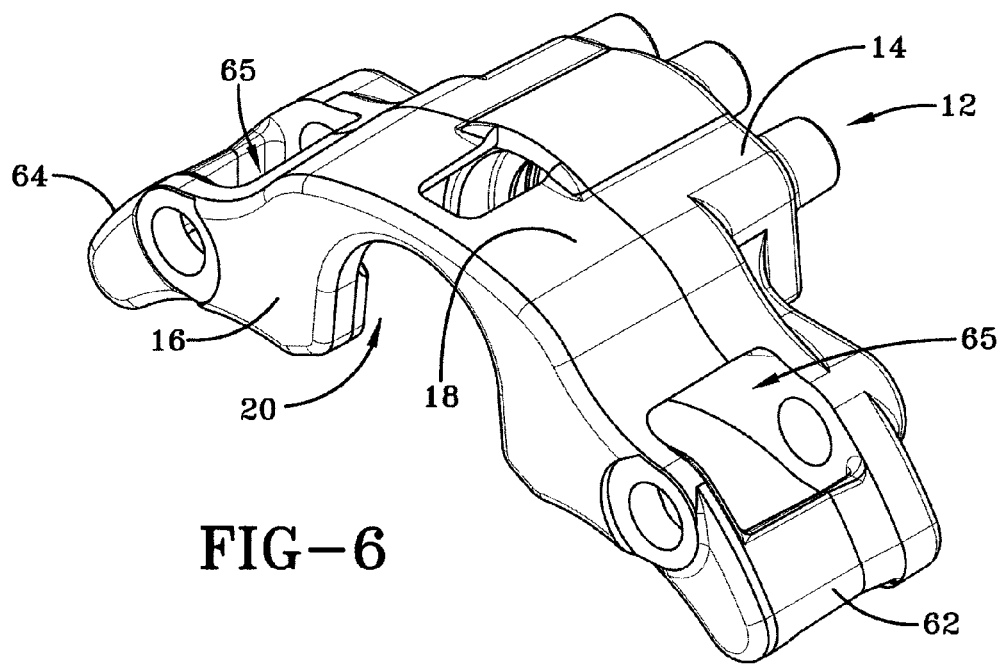
FIG. 6 is rear, top, right side perspective view of a caliper brake housing according to the concepts of the present invention.

First and second stators 38, 40 are movably mounted over mounting bolts 48 that extend through housing 12 at laterally spaced locations. Each mounting bolt includes a hex head 49 at a first end and is threaded at a second end. The mounting bolts 48 extend through second portion 16, opening 20, and first portion 14 of housing 12, and receive a lock-nut 50 on the threaded end to secure them in place. Mounting bolts 48 are also received through holes in mounting bracket 21 to secure the mounting bracket to the housing 12. A first mounting sleeve 52 is positioned around each mounting bolt 48 between the lock-nut 50 and the mounting bracket 21. A second mounting sleeve 54 is positioned around each mounting bolt 48 between the mounting bracket 21 and the hex head 49. Each of the mounting sleeves 52, 54 are received in bushings 56 within housing 12. As seen in FIG. 4, when mounting sleeves 52, 54 are received in bushings 56, mounting sleeves 52, 54 do not contact each other. In certain embodiments, bushings 56 may be press fit into housing 12. The bushings allow the mounting sleeves 52, 54 to be removed from brake 10 when mounting bolts 48 are removed. Bushings 56 also allow the housing 12 to slide on the mounting sleeves 52, 54. Removal of the mounting sleeves 52, 54 facilitates removal of the stators 38, 40 during maintenance. Laterally spaced holes 58 in the stator plate 42 of the first and second stators 38, 40 receive the mounting bolts 48 and the mounting sleeves 52, 54 therein, and allow the first and second stators to move axially on the mounting sleeves.

When the hydraulic piston 28 applies force against the first stator 38, the force is reacted against the first portion 14 of the brake housing, through the bridge 18 to the second portion 16 of the housing, and finally to the second stator 40 and the rotor. Because the bridge 18 is radially offset from the piston, the bridge is under both tension and bending load during a braking event. In prior art caliper brakes the increased loads in the bridge cause deflection, which then causes brake performance problems. For example, when the housing of prior art brakes deflects, the distance the piston must travel to generate a braking force is increased, which requires a larger volume of pressurized fluid. The increased volume of pressurized fluid may be supplied by providing a larger master cylinder, or requiring a longer actuation stroke, neither of which is optimal. In addition, deflection of the bridge can create a drag that counters the retraction forces of the biasing gasket.

Housing 12 of the present invention includes extensions 62 and 64 to increase the stiffness of bridge 18 and reduce deflection during a braking event. Extensions 62 and 64 extend the bridge 18 laterally outward and downward toward the centerline of the piston, thereby reducing the radial offset of the bridge and adding additional material. In certain embodiments, the extensions 62 and 64 may be formed integrally with bridge 18 and/or second portion 16 of housing 12 to eliminate the need for additional fasteners or other components used to assemble the housing.

As shown in FIGS. 1, 2, 5, and 6, each of the opposed extension 62, 64 extends outwardly beyond mounting bolts 48. In addition, the extensions 62, 64 may extend below the level of the mounting bolts 48 without extending immediately under the mounting bolts. The distance that the extensions 62, 64 extend beyond and below the mounting bolts may vary depending upon the load characteristics of the brake and the amount of mounting space in a vehicle to receive the brake. The added material and reduced radial offset provided by the extensions 62, 64 reduces deflection of the housing during a braking event. In certain embodiments, openings or windows 65 may be provided in the bridge over the mounting bolts to provide a window for visual inspection of the stators 38, 40.

During assembly and maintenance of the brake 10, the removability of the mounting bolts 48 and the first and second mounting sleeves 52, 54, allows the stators 38, 40 to be dropped straight down out of the housing 12 despite the existence of the extensions 62, 64. Mounting bolts 48 are first removed, followed by the first and second mounting sleeves 52, 54, which are able to slide in bushings 56. Once the mounting bolts 48 and mounting sleeves 52, 54 are removed from the holes 58 in the stator plates 42, the stators 38, 40 are free to drop out of housing 12. In this way the bridge 18 is strengthened against deflection without rendering the brake 10 unreasonably difficult to service.

It is thus evident that a caliper brake constructed as described herein accomplishes the objects of the present invention and otherwise substantially improves the art.

What is claimed is:

1. A caliper brake comprising a generally U-shaped housing including a first portion, a second portion, and a bridge connecting said first portion and said second portion; a pair of mounting bolts extending between said first and second portions; mounting sleeves carried by each of said mounting bolts, said mounting sleeves being received in a pair of bushings; a pair of stators carried by said mounting sleeves; and bridge extensions extending laterally outwardly from said housing beyond said mounting bolts and downwardly below said mounting bolts, where said mounting sleeves on each of said mounting bolts include a first mounting sleeve in said first portion of said housing and a second mounting sleeve in said second portion of said housing, wherein the pair of bushings includes a first bushing positioned within said first portion of said housing and around each of said first mounting sleeves, and a second bushing positioned within said second portion of said housing and around each of said second mounting sleeves, wherein said first mounting sleeve and said second mounting sleeve do not contact each other, and wherein said bridge includes an opening positioned generally over each of said mounting bolts.

2. The caliper brake of claim 1, further comprising a mounting bracket carried by said mounting bolts.

3. The caliper brake of claim 1, where said housing includes a bore in said first portion, a hydraulic piston being received in said bore and adapted to engage one of said stators, wherein said mounting bolts and said mounting sleeves are positioned below the centerline of said piston.

4. The caliper brake of claim 1, where said bridge extensions are integrally formed with said bridge and said second portion of said housing.

5. The caliper brake of claim 4, where said bridge extensions, said bridge, and said second portion of said housing are formed from a single cast piece.

6. The caliper brake of claim 1, where said mounting bolts include a hex head and a threaded end portion opposite said hex head, and a lock-nut is removably secured on said threaded end portion.

7. The caliper brake of claim 1, where said bridge includes a third opening positioned over said stators.

8. A caliper brake comprising a generally U-shaped housing including a first portion, a second portion, and a bridge connecting said first portion and said second portion; a pair of mounting bolts extending between said first and second portions; mounting sleeves carried by each of said mounting bolts, said mounting sleeves being received in a pair of bushings; a pair of stators carried by said mounting sleeves; and bridge extensions extending laterally outwardly from said housing at an angle of less than 90 degrees with respect to the horizontal plane beyond said mounting bolts and downwardly below said mounting bolts; where said stators each include a stator plate, a liner carried on one surface of said stator plate, and laterally spaced holes in said stator plate that receive said mounting sleeves, wherein said mounting sleeves on each of said mounting bolts include a first mounting sleeve in said first portion of said housing and a second mounting sleeve in said second portion of said housing, wherein said first mounting sleeve and said second mounting sleeve do not contact each other, and wherein said bridge includes an opening positioned generally over each of said mounting bolts.

9. The caliper brake of claim 8, where said liners face one another and are spaced to allow a rotor to be positioned therebetween.

10. A caliper brake comprising:
a housing including a first portion, a second portion spaced from said first portion to form an opening, a bridge extending between said first and second portions spanning said opening, a pair of laterally spaced mounting holes in each of said first and second portions, a bore in said first portion having an open end at said opening, and opposed bridge extensions extending laterally outwardly from said housing beyond said holes and downwardly below said holes;
a pair of mounting bolts extending between said first and second portions and received in said mounting holes, where said bridge includes an opening positioned generally over each of said mounting bolts;
a first mounting sleeve carried by each of said mounting bolts and positioned within said first portion of said housing;
a first bushing positioned within said first portion of said housing and around each of said first mounting sleeves;
a second mounting sleeve carried by each of said mounting bolts and positioned within said second portion of said housing;
a second bushing positioned within said second portion of said housing and around each of said second mounting sleeves, where said first mounting sleeve and said second mounting sleeve do not contact each other;
a pair of stators carried by said mounting sleeves and capable of movement to engage a rotor; and
a hydraulic piston movably positioned within said bore and adapted to engage one of said stators,
wherein said mounting bolts and said mounting sleeves are positioned below the centerline of said piston.

11. The caliper brake of claim 10, where said bridge extensions are integrally formed with said bridge and said second portion of said housing.

* * * * *